United States Patent [19]

Polasky

[11] Patent Number: 5,180,491
[45] Date of Patent: Jan. 19, 1993

[54] APPARATUS FOR REMOVAL OF IRON FROM DRINKING WATER

[75] Inventor: Ralph A. Polasky, Ripon, Wis.

[73] Assignee: Ametek, Inc., Sheboygan, Wis.

[21] Appl. No.: 711,330

[22] Filed: Jun. 6, 1991

[51] Int. Cl.$^5$ .......................................... B01D 27/02
[52] U.S. Cl. ................................... 210/282; 210/484; 210/497.01
[58] Field of Search .............. 210/266, 282, 437, 484, 210/497.01, 501

[56] References Cited

U.S. PATENT DOCUMENTS 4,032,457  6/1977  Matchett .............................. 210/489
4,430,228  2/1984  Paterson .............................. 210/688

Primary Examiner—Ivars Cintins
Attorney, Agent, or Firm—Andrus, Sceales, Starke & Sawall

[57] ABSTRACT

An iron removal system for a drinking water supply includes a synergistic combination of an oxidation/filtration unit and an activated carbon filter unit. The oxidation/filtration unit utilizes a manganese-treated zeolite in the form of normally undesirable fines. The problems of high pressure drop and difficult handling of zeolites fines are eliminated by utilizing a more porous radial tubular flow construction in which the fines are confined in a packed bed. The filter cartridge is made for disposal when exhausted. The series connected activated carbon filter continues to remove iron from the outlet of the zeolite filter long after the capacity for iron removal of the latter has exceeded desirable limits. The combined filter system is less expensive and easier to operate and maintain than a comparable regenerable prior art oxidation/filtration system for iron removal.

1 Claim, 2 Drawing Sheets

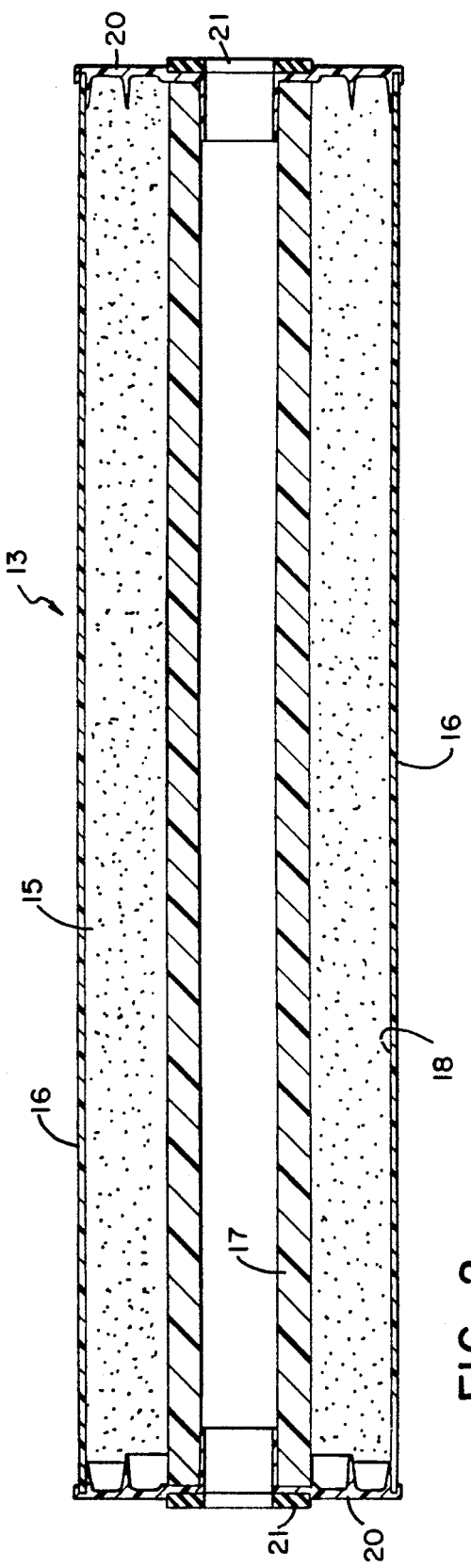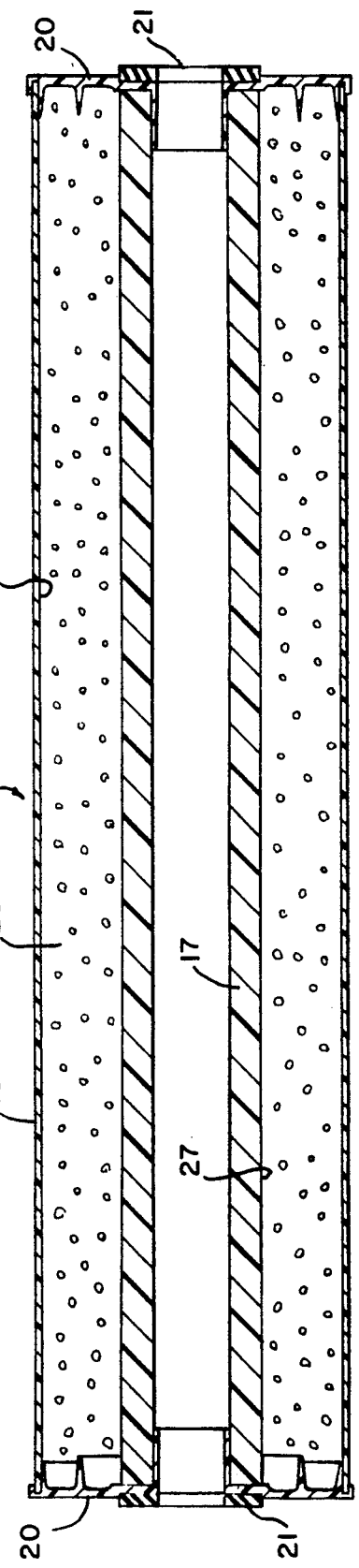

APPARATUS FOR REMOVAL OF IRON FROM DRINKING WATER

BACKGROUND OF THE INVENTION

The present invention relates to a system for removing iron from a supply of water and, in particular, to a method, apparatus and system for simply and effectively filtering a drinking water supply to remove iron.

Many drinking water supplies contain elemental iron or iron compounds in either dissolved or suspended forms. Regardless of the form, very low concentrations of iron are known to cause a characteristic disagreeable taste and to result in a similarly characteristic red stain on fixtures and other utensils with which the water comes in contact. Concentrations of iron in water as low as 0.3 ppm are known to cause iron oxide stains and disagreeable taste.

Several basic methods are known in the art for treating water to remove iron. These include ion exchange, oxidation and filtration, and sequestration. Removal by ion exchange can often be effected through the use of a conventional water softener, if the iron concentration is fairly low. In a sequestration process, the iron is tied up in a complex molecule, such as a polyphosphate, where it is held and prevented from oxidizing. Oxidation and filtration are often combined in a single unit where a base material, such as a zeolite is treated with manganese which acts to convert soluble ferrous iron in the water to insoluble ferric hydroxide which is retained in the granular material by mechanical filtration. Such systems require periodic backwashing to remove the precipitated iron compounds and regeneration to restore the manganese oxide, such as by washing with potassium permanganate.

One type of zeolite which is commonly used in oxidation/filtration systems for iron removal is a manganese-treated sodium aluminosilicate in granular form. This material is typically utilized in a loose bed configuration with the granular material having a particle size substantially in the range of 8 to 50 mesh (approximately 0.5 to 3 mm). A bed depth of 2 to 3 feet may be required for residential drinking water systems and the relatively large particle size is desirable to minimize pressure drop across the bed in the filtering mode and to facilitate backwashing.

Although such manganese-treated zeolite systems can be most effective, they are relatively large and expensive and, furthermore, require more complex flow control systems to accommodate backwashing and regeneration. It would, therefore, be desirable to have an iron removal system which is less complex and expensive, but yet is effective and easy to maintain. In particular, an oxidation/filtration system which does not require backwashing and regeneration, yet will effectively reduce the iron content in water to below 0.3 ppm would be most desirable.

SUMMARY OF THE INVENTION

In accordance with the present invention, an iron removal system, including a unique replaceable iron removal cartridge and method of supplementing its use with a conventional activated carbon filter, provides an effective and low cost system for treating residential drinking water systems in which the source water contains up to 3 ppm or more iron.

The system of the present invention utilizes a non-regenerable filter cartridge element of a hollow, cylindrical construction which is housed in a manner to provide radial flow through an annular confined bed of granular iron-oxidizing material fines. The filter cartridge is used upstream of and in series with a second hollow cylindrical filter cartridge also housed to provide radial flow through an annular bed of porous activated carbon material. The iron-oxidizing material fines are preferably a manganese-treated zeolite, such as potassium permanganate-treated sodium aluminosilicate. The activated carbon filter cartridge preferably utilizes a confined bed of granular activated carbon.

The particle size of the zeolite fines is preferably in the range of 30 to 100 mesh (approximately 0.25 to 0.8mm) and, most preferably, approximately 90% by weight of such fines falls within that size range. The zeolite and carbon filter cartridges may be utilized in a system with a sediment prefilter upstream of the zeolite cartridge.

In one preferred construction of the filter element using iron-oxidizing material fines, a porous cylindrical outer sleeve and a smaller diameter porous cylindrical inner tube define an annular chamber which is filled with the granular iron-oxidizing fines and the adjacent axial ends of the sleeve and tube are sealed by impervious end sealing members. The cartridge may be installed and used in a conventional cylindrical housing with a feed water inlet and filtered water outlet controlling the radial flow through the filter element.

In accordance with the method of the present invention, the flow of raw water, which may first be directed through a sediment pre-filter, is directed through the iron-oxidizing filter fines where the dissolved iron is oxidized and converted to soluble ferric hydroxide which is filtered from the flow in the bed of material fines. When the bed of material fines becomes substantially saturated such that iron begins to overrun the bed, the downstream activated carbon filter cartridge which picks up ferric hydroxide, and possibly unoxidized ferrous ions as well, passing through the saturated upstream filter cartridge. Activated carbon in granular bed form is preferred. The combination of the two iron-oxidizing and activated carbon filter elements provide a substantially extended filter life, but each is relatively inexpensive and easily replaceable when the flow from the system includes iron in excess of about 0.3 ppm. In addition, the carbon filter performs its more typical functions of removing odor and taste.

The water may be periodically tested for iron content in the filtered flow or, preferably, the life of the cartridges is estimated based on the iron content in the raw feed water and the anticipated volume of water use, and are replaced at the end of the estimated time period.

BRIEF DESCRIPTION OF THE DRAWINGS

FIG. 2 is a vertical section through the primary cylindrical filter cartridge of the present invention.

FIG. 4 is a sectional view similar to FIG. 2 of the secondary filter cartridge used in the system of the present invention.

DETAILED DESCRIPTION OF THE PREFERRED EMBODIMENTS

Figure 1:
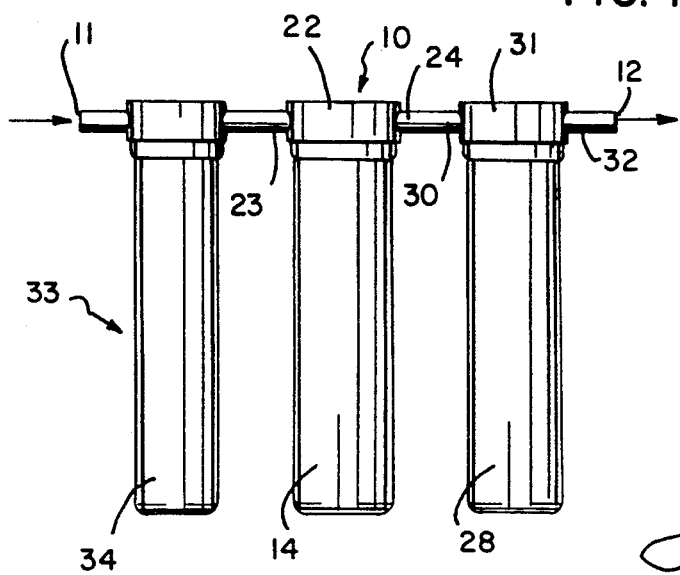
FIG. 1 is an elevation view of the system of the present invention in its presently preferred embodiment.

The system 10 of the present invention is shown in FIG. 1 in a construction adapted to be used to remove iron in a typical residential water system, oftentimes a system utilizing a well as the source of drinking water. The system utilizes a number of filter cartridges installed in series connected housings or sumps so that the water entering the raw water inlet 11 passes serially through each of the filters (three in the system shown) to the filtered water outlet 12.

In the most basic configuration of the system of the present invention, a first filter cartridge 13 (FIGS. 2 and 3) comprises the primary iron removal filter and is installed in a conventional first filter housing 14 or sump, as it is commonly referred to in the industry. The filter cartridge 13 is of a hollow cylindrical construction and includes as its primary filtering element a confined bed of granular iron-oxidizing material fines 15, preferably in the form of a manganese-treated sodium aluminosilicate. Other types of treated zeolites may also be used, including naturally occurring greensand which has been appropriately treated with, for example, potassium permanganate to provide it with an oxidizing coating, all in a manner well known in the art. The filter cartridge 13 includes a porous cylindrical outer sleeve 16 which may comprise, for example, a sheet of porous polyethylene having a thickness of approximately 0.08 inches which is rolled into a cylindrical tube having a diameter of about 4.5 inches. The nominal porosity or micron rating of the outer sleeve 16 is 70 microns. The abutting edges of the sheet are sealed together to form the sleeve 16. A central cylindrical tube 17 is positioned concentrically within the outer sleeve 16 to define therebetween an annular cylindrical chamber 18. The cylindrical inner tube 17 preferably comprises a spun polypropylene material formed into a hollow cylindrical shape having an outer diameter of about 2 inches and a thickness of about 0.5 inch. The nominal porosity or micron rating of the cylindrical tube 17 is 25 microns. Each of the cylindrical elements 16 and 17 defining the annular cylindrical chamber 18 may be about 20 inches in length.

The adjacent ends of the outer sleeve 16 and cylindrical tube 17 at opposite ends thereof are sealed with a pair of end caps 20. The inside surface of each end cap is coated with an appropriate adhesive material to hold the outer sleeve and cylindrical tube in place. The outside surface of each end cap is provided centrally with a sealing gasket 21 of a conventional construction. Before the second end cap 20 is attached, the annular cylindrical chamber 18 is filled with a manganese-treated sodium aluminosilicate in fine granular form to provide the filter bed 15.

The filter cartridge 13 is inserted into the filter housing 14 with the sealing gasket 21 on one end cap engaging the bottom of the housing. A cover 22 encloses the cartridge 13 in the housing 14 and includes means for sealingly engaging the end cap 20 on the opposite end, all in a well known manner. The housing cover 22 includes a first inlet 23 which communicates with an annular space between the inside of the housing wall and the outside of the outer sleeve 16 of the filter cartridge 13. The upper open end of the hollow interior of the cylindrical tube 17 communicates, through the open end cap 20 and sealing gasket 21, with a first outlet 24 in the cover 22 diametrically opposite the inlet 23. The flow of untreated raw water is, thus, radially into the filter cartridge 13 through the porous outer sleeve 16, the bed of manganese-treated zeolite fines 15, and the porous cylindrical tube 17 into the interior thereof. The flow continues axially along the hollow interior of the cylindrical tube 17 into the cover 22 and out through the first outlet 24.

Although iron may be present in water in various compounds and elementally in different valence states, both soluble and insoluble, iron in groundwater feeding a well is typically in a soluble ferrous state, primarily because little oxygen is available in groundwater for oxidation to a higher valence state or to form an iron compound. The first filter cartridge 13 is intended to remove soluble ferrous iron by the well known mechanism of oxidation and filtration. The manganese-treated zeolite bed 15 oxidizes the ferrous iron in the water on contact to form insoluble ferric hydroxide. As the radial flow through the bed of zeolite fines 15 continues, the fines act as a filter to trap the ferric hydroxide and remove it from the flow of water. Ordinarily, a bed of manganese-treated zeolite of rather substantial size would be required to treat a typical residential flow volume of approximately 10 gpm. For example, a bed of 24 to 36 inches (0.6 to 0.9 m) in depth is typically utilized. Also, conventional granular zeolites used for this purpose, such as manganese-treated sodium aluminosilicate, have a particle size typically in the range of 8 to 50 mesh (0.5 to 3 mm). This size has been found to be large enough to be readily confined with conventional filter media separating screens and to provide a relatively low pressure drop across the bed so that desired flow rates may be maintained. In the production of these zeolites, granular material having a smaller particle size is typically not used. This material is characterized as fines and is generally considered waste material. In addition to the inherent increase in pressure drop across a bed of fines, the material is also particularly troublesome in containing for backwashing and regeneration processes.

Applicant has found that manganese-treated sodium aluminosilicate fines can be effectively utilized to remove iron from water when employed in the construction of the particular filter cartridge 13 described above. The greatly increased surface area of the fines material over the conventional larger size granular particulates allows the use of a shorter contact time and, therefore, a smaller bed size. The problem of high pressure drop across the more densely packed bed of fines is overcome by utilizing the radial flow construction described above wherein the thickness of the bed is nominally only 1.25 inches (32 mm). This large surface area, small depth bed of zeolite fines can be confined within the annular chamber 18 defined by the porous outer sleeve 16 and cylindrical tube 17 without adding significantly to the pressure drop through the filter cartridge. In this manner, uniform radial flow through the bed is maintained, and channeling and short-circuiting are prevented. Finally, the prior art problem of the difficulty in handling zeolite fines during backwashing and regeneration is eliminated by constructing the filter cartridge for disposal when saturated.

When substantial degeneration of the manganese-treated zeolite and/or saturation of the fines with ferric hydroxide has occurred, iron will begin to overrun the first filter cartridge 13 and iron removal will progressively decrease. It has been found, however, that the use of an activated carbon filter downstream of the first filter outlet 24 will continue to remove iron by-passing the zeolite filter 13 and allow substantially extended use of the system before the filter cartridges must be replaced. In particular, a second hollow cylindrical filter cartridge 25 enclosing a bed of granular activated carbon 26 has been found to be particularly effective. The granular activated carbon bed 26 not only extends the life of the iron removal system by accommodating iron overrun of the first zeolite filter cartridge 13, but also provides other known benefits of activated carbon filtering to remove undesirable tastes, odors and the like. In this regard, the activated carbon is believed to be helpful in removing permanganates which may be leached from the zeolite fines. The granular activated carbon will remove by adsorption fine colloidal iron compounds, such as ferric hydroxide, which may not be captured in the first filter cartridge 13 because of saturation. Further, activated carbon is also known to possess the capability of promoting the oxidation of ferrous iron in the presence of oxygen, thereby assisting in iron removal after degeneration of the manganese-treated fines.

Figure 3:
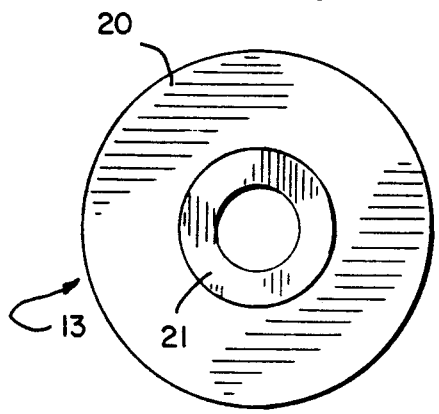
FIG. 3 is an axial end view of the filter cartridge shown in FIG. 2.

The second filter cartridge 25 may be constructed substantially the same as the first filter cartridge 13, except for the difference in the confined granular activated carbon bed 26 itself, as compared to the bed of manganese-treated sodium aluminosilicate fines 15 of the primary filter cartridge. Referring to FIG. 3, the cartridge 25 may include a cylindrical outer sleeve 16 of porous polyethylene and a concentric inner cylindrical tube 17 of spun polypropylene. The annular cylindrical chamber 27 is filled with the granular activated carbon 26 and sealed with end caps 20 provided with sealing gaskets 21 in the same manner previously described with respect to the first filter cartridge 13. Granular activated carbon having a particle size primarily in the range of 20 to 40 mesh (0.6 to 1.25 mm) has been found most effective. A sintered carbon block filter may also be used, but it generally has a greater head loss and is more susceptible to plugging by colloidal iron compounds.

The activated carbon filter cartridge 25 is installed in a second housing 28 to accommodate a radial through flow in the same manner as the flow through the first filter housing 14 described above. Thus, the first outlet 24 from the housing 14 constitutes the inlet 30 to the cover 31 of the housing 28. The cover 31 also includes an outlet 32 for the finally filtered water, which coincides with the filtered water outlet 12 from the system.

Figure 5:
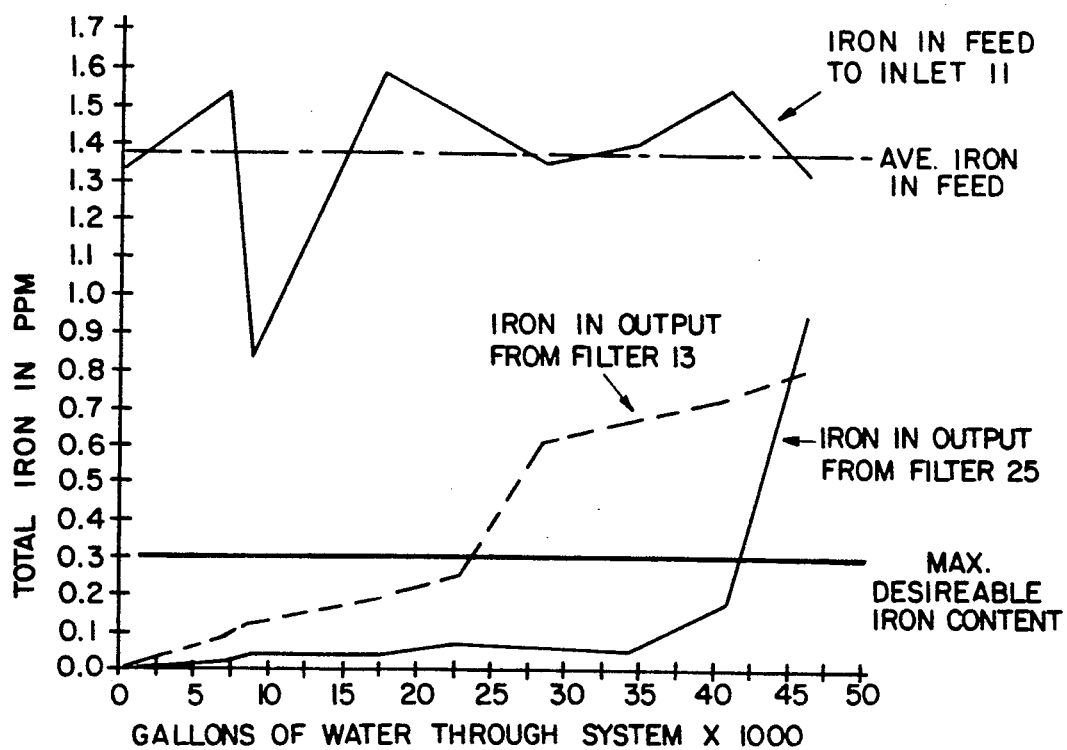
FIG. 5 is a graph showing the performance of the system of the present invention in a typical system for treating a domestic well water supply.

The dual in-line filter system including the first iron-oxidizing filter cartridge 13 and the second granular activated carbon filter cartridge 25 has been found to extend the iron removal capability to, in some cases, accommodate nearly twice the volume as compared to systems using only a primary zeolite cartridge. FIG. 5 shows a graph of iron removal in one residential water system supplied from a well in which the iron content of the raw feed water from the well, the iron content of the filtered water from the outlet 24 of the primary zeolite filter cartridge, and the iron content from the final outlet 12 from the system were measured over approximately a seven month period. During this period, approximately 46,000 gallons of water were used and the iron content in the raw feed water from the well varied from 0.83 ppm to 1.59 ppm. Wide variations in the iron content of water from a well are not unusual and may be related to seasonal and other changes. The upper solid line in the graph of FIG. 5 represents the actual plot of iron in the feedwater over the period of time examined. The dash-dot line running through this plot is the average iron content in the feedwater. The lower solid line on the graph represents the iron in the water exiting the system from the outlet 12. The lower dashed line represents the iron content in the water leaving the first cartridge filter 13 but before entering the second granular activated carbon filter 25. The heavy solid horizontal line represents the maximum desirable iron content of 0.3 ppm for a domestic water supply.

As may be seen from the FIG. 5 graph, the iron removal capability of the manganese-treated zeolite filter 13 exceeded 0.3 ppm just short of approximately 25,000 gallons of total throughput of water. However, the serially connected granular activated carbon filter 25 continued to remove sufficient iron to keep the total content of iron in the outlet 12 from the system below 0.3 ppm until nearly 43,000 gallons were treated. At this point, the combined filter cartridges in the system were no longer effective and were removed and replaced.

The system represented by the graph in FIG. 5 and as shown in FIG. 1 included a sediment prefilter 33. Sediment filters are well known in the art and may include any of a variety of filter constructions removably installed in a sediment filter housing 34, in much the same manner as the cartridges 13 and 25 installed in housings 14 and 28, respectively. The sediment filter may comprise a conventional pleated paper filter cartridge or it may be a tubular cylindrical spun polypropylene filter somewhat similar to the porous cylindrical tube 17 used in both the zeolite filter cartridge 13 and the granular activated carbon filter cartridge 25. The sediment filter is utilized to remove a large variety of suspended solid materials, including in some cases iron oxide particles where the well water is exposed to sufficient oxygen before reaching the filter system. This could occur, for example, in a holding tank or in a pump, but in any event, a sediment prefilter 33 is usually desirable in an iron filter system of the present invention.

If the average iron content in the feedwater from a well or other source can be determined in advance, replacement of the filter cartridges in the system may be based on the metered flow of water used. Also, if the average water consumption is known or can be reasonably estimated, the filter cartridges may be replaced on an estimated time basis. Also, finally filtered water from the system outlet 12 may be periodically tested and the cartridges replaced when the iron content exceeds a maximum desired limit, such as 0.3 ppm.

Various modes of carrying out the present invention are contemplated as being within the scope of the following claims particularly pointing out and distinctly claiming the subject matter which is regarded as the invention.

I claim:

1. An iron removal cartridge filter element for a drinking water supply comprising:
 a porous cylindrical outer sleeve;
 a porous cylindrical inner tube;
 said outer sleeve and inner tube mounted concentrically to define therebetween an annular cylindrical chamber enclosed by impervious sealing means joining the adjacent axial ends of said sleeve and tube; and,
 a bed of granular iron-oxidizing material fines substantially filling said annular chamber, said bed comprising particulate manganese-treated sodium aluminosilicate, the major portion of which has a particle size int he range of 30 to 100 mesh.

* * * * *